(12) United States Patent
Ha et al.

(10) Patent No.: US 7,177,144 B2
(45) Date of Patent: Feb. 13, 2007

(54) TILTING APPARATUS OF MONITOR

(75) Inventors: Sang-kyeong Ha, Suwon (KR); Nam-ill Cho, Suwon (KR); Kwey-hyun Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/314,350

(22) Filed: Dec. 9, 2002

(65) Prior Publication Data

US 2003/0223188 A1 Dec. 4, 2003

(30) Foreign Application Priority Data

May 28, 2002 (KR) ........................................ 2002-29540

(51) Int. Cl.
*G06F 1/16* (2006.01)

(52) U.S. Cl. ........................ 361/681; 361/682; 248/584
(58) Field of Classification Search ................. 361/679, 361/681–682; 248/584–585, 597, 917–920
See application file for complete search history.

(56) References Cited

U.S. PATENT DOCUMENTS

| | | |
|---|---|---|
| 2,041,370 A | 5/1936 | Vear |
| 2,628,142 A | 2/1953 | Ema |
| 2,890,010 A | 6/1959 | Barkhemer |
| 3,788,587 A | 1/1974 | Stemmier |
| 4,113,215 A | 9/1978 | Stapleton |
| 4,166,522 A | 9/1979 | Bourcier de Carbon |
| 4,235,405 A | 11/1980 | Carey |
| 4,329,800 A | 5/1982 | Shuman |
| 4,339,104 A | 7/1982 | Weidman |
| 4,395,010 A | 7/1983 | Helgeland et al. |

(Continued)

FOREIGN PATENT DOCUMENTS

| | | |
|---|---|---|
| CN | 1031010 C | 2/1996 |
| CN | 2504675 | 8/2002 |

(Continued)

OTHER PUBLICATIONS

Jobs et al. (US 2003/0086240 A1), "Computer Controlled Display Device", May 8, 2003.*
U.S. Appl. No. 10/694,029, filed Oct. 2003, Nam–il Cho, Samsung Electronics Co., Ltd.

(Continued)

*Primary Examiner*—Yean-Hsi Chang
(74) *Attorney, Agent, or Firm*—Staas & Halsey LLP

(57) ABSTRACT

A monitor having a monitor body and a base member supporting the monitor body includes a link member positioned between the monitor body and the base member, a base hinge connecting one end of the link member with the base member in a tiltable manner to control the link member to be tilted relative to the base member within a predetermined degree of angle, a monitor hinge connecting the other end of the link member with the monitor body in the tiltable manner, an assistant link member transmitting a tilting movement of the link member relative to the base member to the monitor body, a first torsion coil spring elastically biasing the base member and the link member in opposite directions when the link member is forwardly tilted relative to the base member, and a second torsion coil spring elastically biasing the link member and the monitor in opposite directions when the monitor body is forwardly tilted relative to the link member. With this configuration, a monitor body can be easily adjusted in its height and viewing angle. Especially in a case of the monitor having a large-sized monitor body, the height and viewing angle thereof can be easily adjusted, and the viewing angle of the monitor body originally set up can be maintained when the height of the monitor body is adjusted. Also, a tilting angle of the monitor body can be adjusted relative to the base member.

39 Claims, 12 Drawing Sheets

U.S. PATENT DOCUMENTS

| | | | |
|---|---|---|---|
| 4,438,458 A | 3/1984 | Münscher | |
| 4,447,031 A | 5/1984 | Souder, Jr. et al. | |
| 4,669,694 A | 6/1987 | Malick | |
| 4,690,362 A | 9/1987 | Helgeland | |
| 4,691,886 A | 9/1987 | Wedling et al. | |
| 4,729,533 A | 3/1988 | Hillary et al. | |
| D295,415 S | 4/1988 | Thies et al. | |
| 4,768,744 A | 9/1988 | Leeds et al. | |
| 4,777,750 A | 10/1988 | Garfinkle | |
| 4,834,329 A | 5/1989 | Delapp | |
| 4,846,434 A | 7/1989 | Krogsrud | |
| 4,859,092 A | 8/1989 | Makita | |
| 4,864,601 A | 9/1989 | Berry | |
| 4,924,931 A | 5/1990 | Miller | |
| D313,405 S | 1/1991 | Barry et al. | |
| 4,989,813 A | 2/1991 | Kim et al. | |
| 5,012,852 A | 5/1991 | Blackhurst | |
| 5,088,676 A | 2/1992 | Orchard et al. | |
| 5,102,084 A | 4/1992 | Park | |
| 5,107,402 A | 4/1992 | Malgouires | |
| 5,112,019 A | 5/1992 | Metzler et al. | |
| 5,144,290 A | 9/1992 | Honda et al. | |
| 5,163,652 A | 11/1992 | King | |
| 5,206,790 A | 4/1993 | Thomas et al. | |
| D337,104 S | 7/1993 | Orchard | |
| D349,489 S | 8/1994 | Wang | |
| 5,335,142 A | 8/1994 | Anderson | |
| 5,383,138 A | 1/1995 | Motoyama et al. | |
| 5,422,951 A | 6/1995 | Takahashi et al. | |
| 5,437,236 A | 8/1995 | Zeiner | |
| 5,751,548 A | 5/1998 | Hall et al. | |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | |
| 5,835,342 A | 11/1998 | Hunte | |
| 5,876,008 A * | 3/1999 | Sweere et al. | 248/325 |
| 5,894,633 A | 4/1999 | Kaneko | |
| 5,911,523 A | 6/1999 | Burchart | |
| 5,924,665 A | 7/1999 | Sweere et al. | |
| 5,941,493 A | 8/1999 | Cheng | |
| 5,975,472 A | 11/1999 | Hung | |
| 5,992,809 A | 11/1999 | Sweere et al. | |
| 5,997,493 A | 12/1999 | Young | |
| 6,012,693 A * | 1/2000 | Voeller et al. | 248/280.11 |
| 6,015,120 A | 1/2000 | Sweere et al. | |
| 6,018,847 A | 2/2000 | Lu | |
| 6,031,714 A | 2/2000 | Ma | |
| 6,062,148 A | 5/2000 | Hodge et al. | |
| 6,064,373 A | 5/2000 | Ditzik | |
| 6,081,420 A | 6/2000 | Kim et al. | |
| 6,113,046 A | 9/2000 | Wang | |
| 6,116,690 A | 9/2000 | Larson | |
| 6,134,103 A | 10/2000 | Ghanma | |
| 6,145,797 A | 11/2000 | Uehara | |
| 6,164,611 A | 12/2000 | Kuhnke | |
| 6,189,842 B1 | 2/2001 | Bergeron Gull et al. | |
| 6,189,849 B1 | 2/2001 | Sweere et al. | |
| 6,231,021 B1 | 5/2001 | Hong | |
| 6,270,047 B1 | 8/2001 | Hudson | |
| 6,266,794 B1 | 9/2001 | Harbin | |
| 6,326,955 B1 | 12/2001 | Ditzik | |
| 6,347,433 B1 | 2/2002 | Novin et al. | |
| 6,352,226 B1 | 3/2002 | Gordon | |
| 6,367,756 B1 | 4/2002 | Wang | |
| 6,378,830 B1 | 4/2002 | Lu | |
| 6,381,125 B1 | 4/2002 | Mizoguchi et al. | |
| 6,390,433 B1 | 5/2002 | Kasa-Djukic | |
| 6,397,761 B1 | 6/2002 | Moore | |
| 6,419,196 B1 | 7/2002 | Sweere et al. | |
| 6,494,150 B1 | 12/2002 | Phoenix et al. | |
| 6,499,704 B2 | 12/2002 | Oddsen, Jr. | |
| 6,502,792 B1 | 1/2003 | Cho et al. | |
| 6,532,628 B2 | 3/2003 | Kim | |
| 6,585,201 B1 | 7/2003 | Reed | |
| 6,592,090 B1 | 7/2003 | Li | |
| 6,601,810 B2 | 8/2003 | Lee | |
| 6,609,272 B1 | 8/2003 | Lee | |
| 6,695,266 B1 | 2/2004 | Tsai | |
| 6,698,063 B2 | 3/2004 | Kim et al. | |
| 6,702,238 B1 | 3/2004 | Wang | |
| 6,712,321 B1 | 3/2004 | Su et al. | |
| 6,766,994 B2 | 7/2004 | Serbinski et al. | |
| 6,609,686 B2 | 8/2004 | Malizia | |
| 6,796,541 B2 | 9/2004 | Lu | |
| 6,819,550 B2 | 11/2004 | Jobs et al. | |
| 6,822,857 B2 | 11/2004 | Jung et al. | |
| 6,168,124 B1 | 1/2005 | Matsuoka et al. | |
| 6,672,533 B1 | 1/2005 | Regebro | |
| 6,680,843 B2 | 1/2005 | Farrow et al. | |
| 6,837,469 B2 | 1/2005 | Wu et al. | |
| 6,189,850 B1 | 2/2005 | Liao et al. | |
| 6,522,530 B2 | 2/2005 | Bang | |
| 6,695,274 B1 | 2/2005 | Chiu | |
| 6,857,610 B1 | 2/2005 | Conner et al. | |
| 6,708,940 B2 | 3/2005 | Ligertwood | |
| D489,370 S | 5/2005 | Jobs et al. | |
| 6,233,138 B1 | 5/2005 | Osgood | |
| 6,394,403 B1 | 5/2005 | Hung | |
| 6,402,109 B1 | 6/2005 | Dittmer | |
| 6,409,134 B1 | 6/2005 | Oddsen, Jr. | |
| 6,430,038 B1 | 8/2005 | Helot et al. | |
| 6,769,657 B1 | 8/2005 | Huang | |
| 6,288,891 B1 | 9/2005 | Hasegawa et al. | |
| 6,954,221 B2 | 10/2005 | Wu | |
| 6,478,275 B1 | 11/2005 | Huang | |
| 7,055,218 B2 | 6/2006 | Lu et al. | |
| 2001/0017761 A1 | 8/2001 | Ditzik | |
| 2002/0020792 A1 | 2/2002 | Lee | |
| 2003/0080949 A1 | 5/2003 | Ditzik | |
| 2003/0086240 A1 | 5/2003 | Jobs et al. | |
| 2004/0011932 A1 | 1/2004 | Duff | |
| 2004/0056161 A1 | 3/2004 | Ishizaki et al. | |
| 2004/0084585 A1 | 5/2004 | Liu et al. | |
| 2004/0084588 A1 | 5/2004 | Liu et al. | |
| 2004/0118984 A1 | 6/2004 | Kim et al. | |
| 2002/0011544 A1 | 1/2005 | Bosson | |
| 2004/0057197 A1 | 3/2005 | Hill et al. | |
| 2003/0075649 A1 | 4/2005 | Jeong et al. | |
| 2003/0075653 A1 | 4/2005 | Li | |
| 2003/0132360 A1 | 7/2005 | Ju | |
| 2003/0142474 A1 | 7/2005 | Karidis et al. | |
| 2002/0130981 A1 | 9/2005 | Ma et al. | |

FOREIGN PATENT DOCUMENTS

| | | |
|---|---|---|
| DE | 2847135 | 5/1980 |
| DE | 39 43 137 A1 | 8/1991 |
| DE | 200 09 691 | 11/2000 |
| DE | 4214341 A1 | 7/2003 |
| EP | 0 046 225 | 2/1982 |
| EP | 244 566 | 11/1987 |
| EP | 0 631 174 B1 | 4/1998 |
| EP | 631 174 B1 | 4/1998 |
| EP | 1085753 | 3/2001 |
| GB | 2 206 464 | 1/1989 |
| JP | 57151990 | 9/1982 |
| JP | 57-151990 | 9/1982 |
| JP | 61-99873 | 5/1986 |
| JP | 61-99874 | 5/1986 |
| JP | 61-196314 | 8/1986 |
| JP | 62-96681 | 5/1987 |

| | | |
|---|---|---|
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 03-2381 | 1/1991 |
| JP | 3-29800 | 3/1991 |
| JP | 3-095586 | 4/1991 |
| JP | 3-113423 | 11/1991 |
| JP | 3-114875 | 11/1991 |
| JP | 4-15680 | 1/1992 |
| JP | 4-33073 | 3/1992 |
| JP | 4-81182 | 3/1992 |
| JP | 4-107284 | 4/1992 |
| JP | 4155375 | 5/1992 |
| JP | 4-155375 | 5/1992 |
| JP | 4-198979 | 7/1992 |
| JP | 3-017022 | 9/1992 |
| JP | 4-132517 | 12/1992 |
| JP | 5-36523 | 2/1993 |
| JP | 5-097098 | 4/1993 |
| JP | 5-36423 | 5/1993 |
| JP | 5-188865 | 7/1993 |
| JP | 05-66715 | 9/1993 |
| JP | 64778 | 1/1994 |
| JP | 6-37912 | 2/1994 |
| JP | 6-21079 | 3/1994 |
| JP | 6-118880 | 4/1994 |
| JP | 8-121009 | 5/1996 |
| JP | 8-234672 | 9/1996 |
| JP | 8-319753 | 12/1996 |
| JP | P 8-319753 | 12/1996 |
| JP | 10-126068 | 5/1998 |
| JP | 10-214034 | 8/1998 |
| JP | P 10-228333 | 8/1998 |
| JP | 10-228333 | 8/1998 |
| JP | 11-006520 | 1/1999 |
| JP | 11-095866 | 4/1999 |
| JP | 11095866 | 4/1999 |
| JP | 11-154460 | 6/1999 |
| JP | 11-214859 | 8/1999 |
| JP | P 11-214859 | 8/1999 |
| JP | 11-338576 | 12/1999 |
| JP | 2000-019981 | 1/2000 |
| JP | 3068198 | 2/2000 |
| JP | 200056695 | 2/2000 |
| JP | 2000-56695 | 2/2000 |
| JP | 2000-122561 | 4/2000 |
| JP | 2000-206893 | 7/2000 |
| JP | 2000-206901 | 7/2000 |
| JP | 3073553 | 9/2000 |
| JP | 200242363 | 9/2000 |
| JP | 2000-242363 | 9/2000 |
| JP | 2000267581 | 9/2000 |
| JP | 2002267581 | 9/2000 |
| JP | 2001-50244 | 2/2001 |
| JP | 2001142407 | 5/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1989-3755 | 6/1989 |
| KR | 88-3444 | 10/1989 |
| KR | 1989-20328 | 10/1989 |
| KR | 19910009310 | 5/1991 |
| KR | 1991-0009310 | 5/1991 |
| KR | 114350 | 11/1997 |
| KR | 1997-63717 | 12/1997 |
| KR | 1998-4698 | 3/1998 |
| KR | 163133 | 9/1998 |
| KR | 1999-40596 | 6/1999 |
| KR | 1999-0075223 | 10/1999 |
| KR | 20-168389 | 11/1999 |
| KR | 2000-722 | 1/2000 |
| KR | P 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | P 20-184275 | 3/2000 |
| KR | 20-0178710 | 4/2000 |
| KR | 20-0191805 | 8/2000 |
| KR | 20-215332 | 12/2000 |
| KR | 2000-73608 | 12/2000 |
| KR | 2002-5136 | 2/2001 |
| KR | P 2002-5136 | 2/2001 |
| KR | 10-0289438 | 2/2001 |
| KR | 20-227925 | 4/2001 |
| KR | 20-227953 | 4/2001 |
| KR | P 20-227953 | 4/2001 |
| KR | 2001-35722 | 5/2001 |
| KR | 2001-0035722 | 5/2001 |
| KR | 20-0227925 | 6/2001 |
| KR | 20-239991 | 7/2001 |
| KR | 2001-53963 | 7/2001 |
| KR | 2001-56960 | 7/2001 |
| KR | P 2001-56960 | 7/2001 |
| KR | 2001-83865 | 9/2001 |
| KR | P 2001-83865 | 9/2001 |
| KR | 20-251611 | 10/2001 |
| KR | P 20-256809 | 11/2001 |
| KR | 20-256809 | 11/2001 |
| KR | 20-0253576 | 11/2001 |
| KR | 20-0256013 | 11/2001 |
| KR | 20-259625 | 12/2001 |
| KR | 20002-5136 | 1/2002 |
| KR | 2002-0029616 | 4/2002 |
| KR | 20-279427 | 6/2002 |
| KR | 20-0279427 | 6/2002 |
| KR | 10-353035 | 9/2002 |
| KR | P 20-253576 | 10/2002 |
| KR | 20-295990 | 11/2002 |
| KR | 20-304340 | 2/2003 |
| KR | 2003-0058204 | 7/2003 |
| KR | 20030058204 | 7/2003 |

OTHER PUBLICATIONS

U.S. Appl. No. 10/671,605, filed Sep. 2003, Jun–soo Jeong, Samsung Electronics Co., Ltd.
U.S. Appl. No. 10/295,831, filed Nov. 18, 2002, Hyun–jun Jung et al., Samsung Electronics Co, LTD.
U.S. Appl. No. 10/646,864, filed Apr. 1, 2003, You–Sik Hong et al., Samsung Electronics Co., LTD.
U.S. Appl. No. 10/671,605, filed Sep.1, 2003, Jun–soo Jeong, Samsung Electronics Co., LTD.
U.S. Appl. No. 10/671,863, filed Sep. 1, 2003, Ju–hwan Kim et al., Samsung Electronics Co. LTD.
U.S. Appl. No. 10/694,029, filed Oct. 1, 2003, Nam–il Cho et al., Samsung Electronics Co. LTD.
U.S. Appl. No. 10/694,041, filed Oct. 1, 2003, You–Sub Lee et al., Samsung Electronics Co. LTD.
U.S. Appl. No. 10/705,770, filed Nov. 1, 2003, Ju–hwan Kim et al., Samsung Electronics Co. LTD.
U.S. Appl. No. 10/792,745, filed Mar. 1, 2004, Sang–kyeong Ha et al., Samsung Electronics Co., LTD.
U.S. Appl. No. 10/916,436, filed Aug. 12, 2004, Hyun–jun Jung et al., Samsung Electronics Co, LTD.
U.S. Appl. No. 10/916,447, filed Aug. 12, 2004, Hyun–jun Jung et al., Samsung Electronics Co, LTD.

U.S. Appl. No. 10/406,269, filed Apr. 4, 2003, You–sik Hong et al., Samsung Electronics Co, LTD.

Vesa Mounting Interface Standard, Mar. 19, 2003, 2 pages, www.ergotron.com/2_Product_pages/FP_ARMS/VESA/fp_vesa.asp.

Third Party Submission document filed Aug. 27, 2004 in Korean Industrial Property Office, issued Sep. 22, 2004.

Chinese Office Action of Application No. 03110326.X issued Sep. 24, 2004.

Chinese Office Action of Application No. 03154931.4 issued on Sep. 9, 2005.

Singapore Office Action issued on May 13, 2005.

Korean Office Action issued on Jul. 26, 2004.

Japanese Office Action mailed Sep. 21, 2004 in JP 2002-333914.

Copy of Japanese Office Action mailed Jun. 14, 2005 in JP 2002-333914.

Copy of Korean Office Action issued on Mar. 16, 2005.

Copy of Korean Office Action issued on Aug. 20, 2004.

Copy of SIPO Office Action issued on Sep. 9, 2005.

* cited by examiner

TILTING APPARATUS OF MONITOR

CROSS-REFERENCE TO RELATED APPLICATIONS

This application claims the benefit of Korean Patent Application No. 2002-29540, filed May 28, 2002, in the Korean Intellectual Property Office, the disclosure of which is incorporated herein by reference.

BACKGROUND OF THE INVENTION

1. Field of the Invention

The present invention relates to a monitor, and more particularly, to a monitor with an improved tilting structure connecting a monitor body to a base member.

2. Description of the Related Art

A conventional monitor includes, as depicted in FIG. 1, a base member 201 disposed on a horizontal surface, a monitor body 202 on which a picture is displayed, and a coupling member 210 coupling the base member 201 to the monitor body 202.

A lower end of the coupling member 210 is rotatably supported by a pair of base brackets 204 and 206 coupled to the base member 201 to be tilted with respect to the base member 201, and an upper end of the coupling member 210 is fixedly coupled to the monitor body 202. As indicated by an arrow A in FIG. 1, the coupling member 210 can be tilted vertically relative to the base member 201, but the monitor body 202 cannot be tilted relative to the coupling member 210.

As depicted in FIGS. 2A and 2B, an angle between the monitor body 202 and the coupling member 210 in the conventional monitor is not variable but fixed. Thus, in a case where a user adjusts a height of the monitor body 202 by tilting the coupling member 210 downward or upward relative to the base member 201, the user cannot see the picture displayed on the monitor at an exact and convenient viewing point.

In an attempt to solve the above problem, there has been developed and used another monitor (not shown) having the upper end of the coupling member 210 which is rotatably coupled to the monitor body 202 to be tilted relative to the monitor body 202, and the lower end of the coupling member 210 fixed to the base member 201. In this case, the user may control a viewing angle of the monitor, but a height of the monitor body 202 with respect to the base member 210 cannot be controlled.

Recently, a large-sized monitor has been marketed in order to satisfy the demands of a user, but it is not easy for the user to control the height and/or the viewing point of the monitor body.

In addition, since each country has its own and different regulations limiting the rotation angle of the monitor body relative to the base member, the coupling members provided in the conventional monitor cannot make up for the difference in the rotation angles.

SUMMARY OF THE INVENTION

Accordingly, it is an object of the present invention to provide a monitor having a monitor body which can be easily adjusted with respect to a base member and a link member in height and viewing angle. Especially in a case where the monitor body is a large-sized monitor body, the height and viewing angle thereof can be easily adjusted, and the viewing angle of the monitor body originally set up can be maintained when the height of the monitor body is adjusted.

Another object of the present invention is to provide a monitor suitable for complying with different regulations limiting a different tilting angle of the monitor body relative to the based member.

Additional objects and advantageous of the invention will be set forth in part in the description which follows and, in part, will be obvious from the description, or may be learned by practice of the invention.

The foregoing and other objects of the present invention are achieved by providing a monitor having a monitor body, a base member supporting the monitor body, a link member disposed and rotatably connected between the monitor body and the base member, a base hinge connecting a lower end of the link member with the base member in a tiltable manner, the link member being tiltable relative to the base member within a predetermined degree of angle, a monitor hinge connecting an upper end of the link member with the monitor body in the tiltable manner, an assistant link member transmitting a tilting movement of the link member relative to the base member to the monitor body so as for the monitor body to move relative to the link member, a first torsion coil spring elastically biasing the link member and the base member in opposite directions when the link member is forwardly and backwardly tilted relative to the base member, and a second torsion coil spring elastically biasing the link member and the monitor body in opposite directions when the monitor body is forwardly and backwardly tilted relative to the link member.

According to an aspect of the present invention, the monitor further includes a pair of first and second base brackets disposed at a predetermined interval and coupled to the base member, wherein boss receiving parts with a non-circular section are formed on respective opposite ends of the first and second base brackets, and the base hinge includes first and second base hinge parts connecting opposite sides of the upper end of the link member respectively to the first and second base brackets in the tiltable manner.

According to another aspect of the present invention, each of the first and second base hinge parts includes a first pin receiving part formed on a side of the lower end of the link member, a first link supporting part including a boss part with a non-circular section fitted to the boss receiving part of the first or second base bracket provided at one end thereof, and a second pin receiving part with a circular section provided at the other end thereof, and a first hinge pin having a first end inserted into the first pin receiving part in the tiltable manner and a second end fixedly inserted into the first pin receiving part.

According to another aspect of the present invention, at least one of the first link supporting parts includes a first spring supporting part supporting the first torsion coil spring, and the first torsion coil spring is supported by the link member at one end thereof and by at least one of the first and the second base brackets at the other end thereof.

According to another aspect of the present invention, the monitor further includes a tilting angle limiting unit provided in at least one of the first and second base hinge parts to limit a tilting angle of the link member relative to the base member.

According to another aspect of the present invention, the tilting angle limiting unit includes a pair of first stoppers provided in at least one of opposite sides of the lower end of the link member and formed around the first pin receiving part in a radial direction of the first pin receiving part to be spaced-apart from each other, and a pair of first projection parts provided in at least one end of the first link supporting part and formed around the second pin receiving part to be selectively caught by the respective first stoppers according to a tilting direction of the link member.

According to another aspect of the present invention, the monitor further includes first and second monitor brackets disposed in a pair at a predetermined interval to be coupled to the monitor body, wherein the monitor hinge includes first and second monitor hinge parts connecting opposite sides of the upper end of the link member with the first and second monitor brackets in the tiltable manner.

According to another aspect of the present invention, each of the first and second monitor hinge parts includes a hinge inserting hole formed on a side of the upper end of the link member, a first pin receiving part with a circular section formed at one end side of the first and second monitor brackets, a second link support part having a hinge inserting part inserted into the hinge inserting hole in the tiltable manner, a second spring receiving part supporting the second torsion coil spring on one side of the hinge inserting part, a fourth pin receiving part with a circular section formed opposite to the third pin receiving part at one side of the second spring receiving part, and a second hinge pin having a first end inserted into the fourth pin receiving part in the tiltable manner and a second end fixedly inserted into the third pin receiving part.

According to another aspect of the present invention, the second torsion coil spring is supported by the second link supporting part at its one end, and by at least one of the first and second base brackets at its other end.

According to another aspect of the present invention, the monitor further includes a monitor angle limiting unit provided in at least one of the first and second monitor hinge parts to limit a tilting angle of the monitor body relative to the link member.

According to another aspect of the present invention, the monitor angle limiting unit includes a pair of second stoppers provided in at least one of the first or second monitor brackets formed with the third pin receiving part, radially formed to be spaced-apart from each other, and a pair of second projection parts provided in at least of end of the second link support part and formed around the fourth pin receiving part in a radial direction of the fourth pin receiving part to be selectively caught by the second stoppers according to a tiling direction of the monitor body.

According to another aspect of the present invention, the assistant link member includes first and second assistant link members formed in a pair disposed in at least one of side edges of the link member.

According to another aspect of the present invention, the base hinge and the monitor hinge are respectively formed with link member receiving parts receiving the first and second assistant link members at a predetermined interval.

According to another aspect of the present invention, the base hinge and the monitor hinge parts are respectively formed with a plurality of pin inserting holes formed at a predetermined interval, and the first and second assistant link members are formed with passing holes communicating with the pin inserting holes at opposite ends thereof, and a plurality of link coupling pins is inserted into the passing holes and the pin inserting holes.

According to another aspect of the present invention, the link members are provided with link member receiving parts having a "U" shape to receive the first and second assistant link members at opposite ends thereof.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
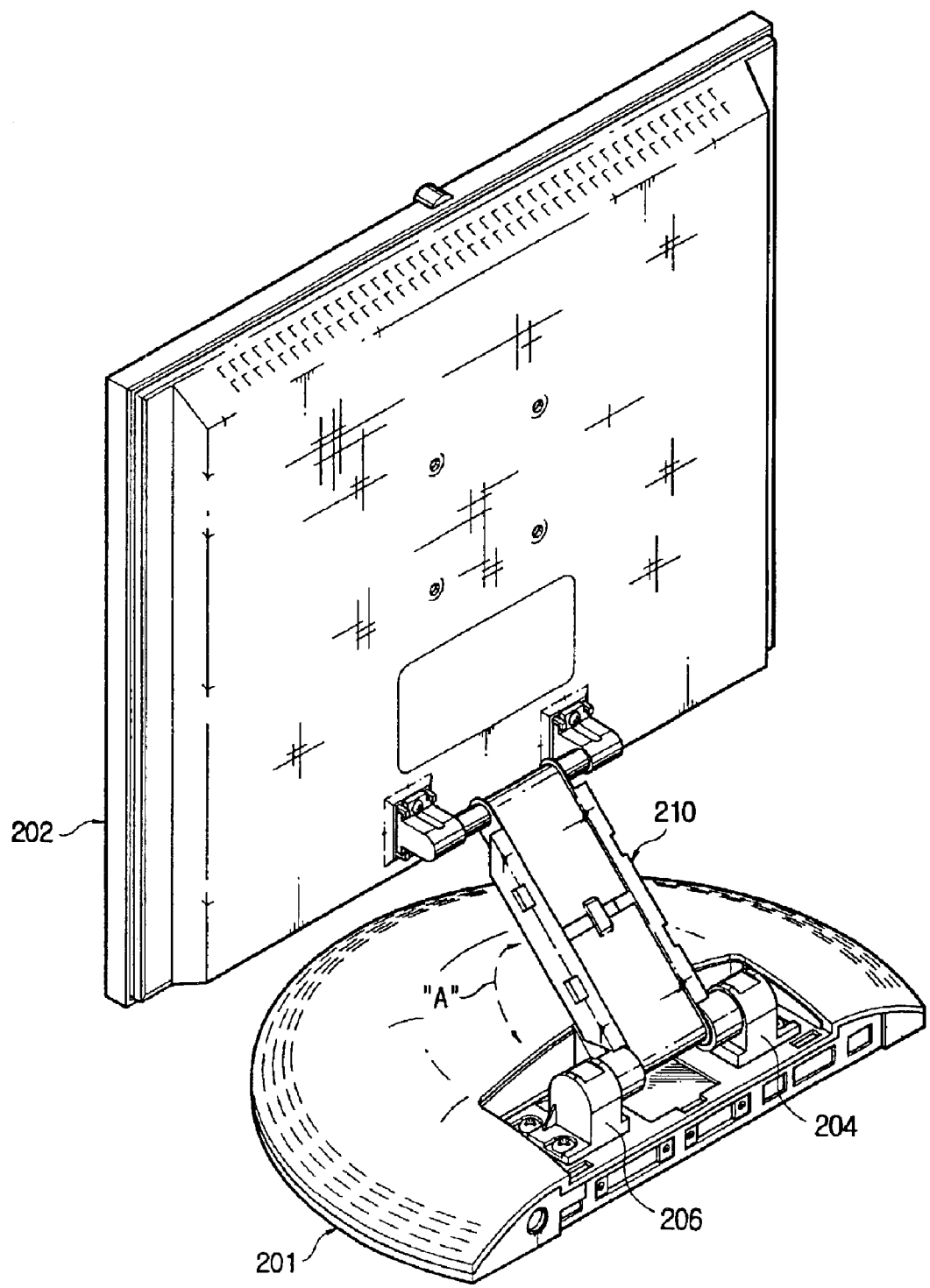
FIG. 1 is a rear perspective view of a conventional monitor.
Figure 2A:
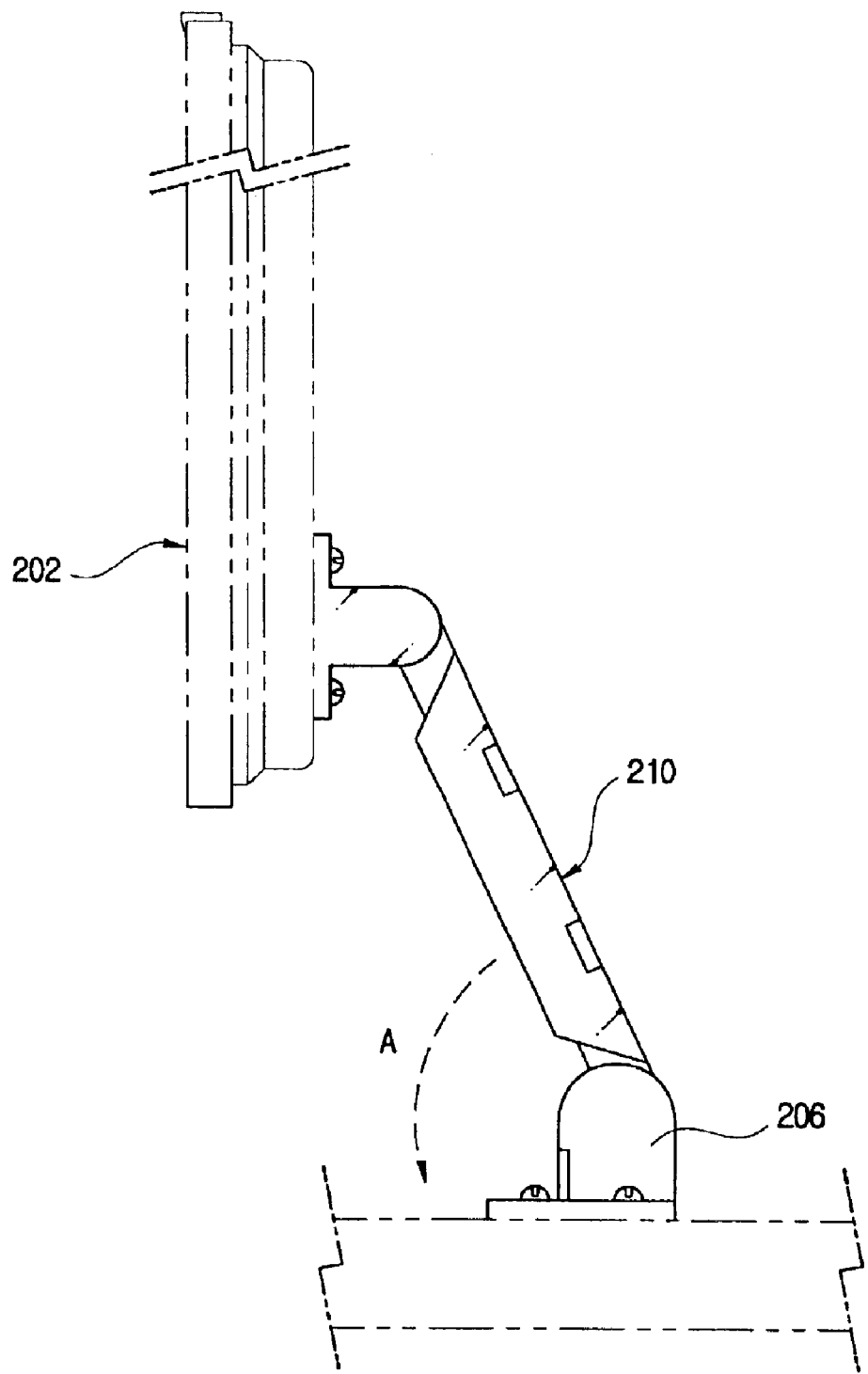
FIGS. 2A and 2B are side views of the conventional monitor of FIG. 1.
Figure 2B:
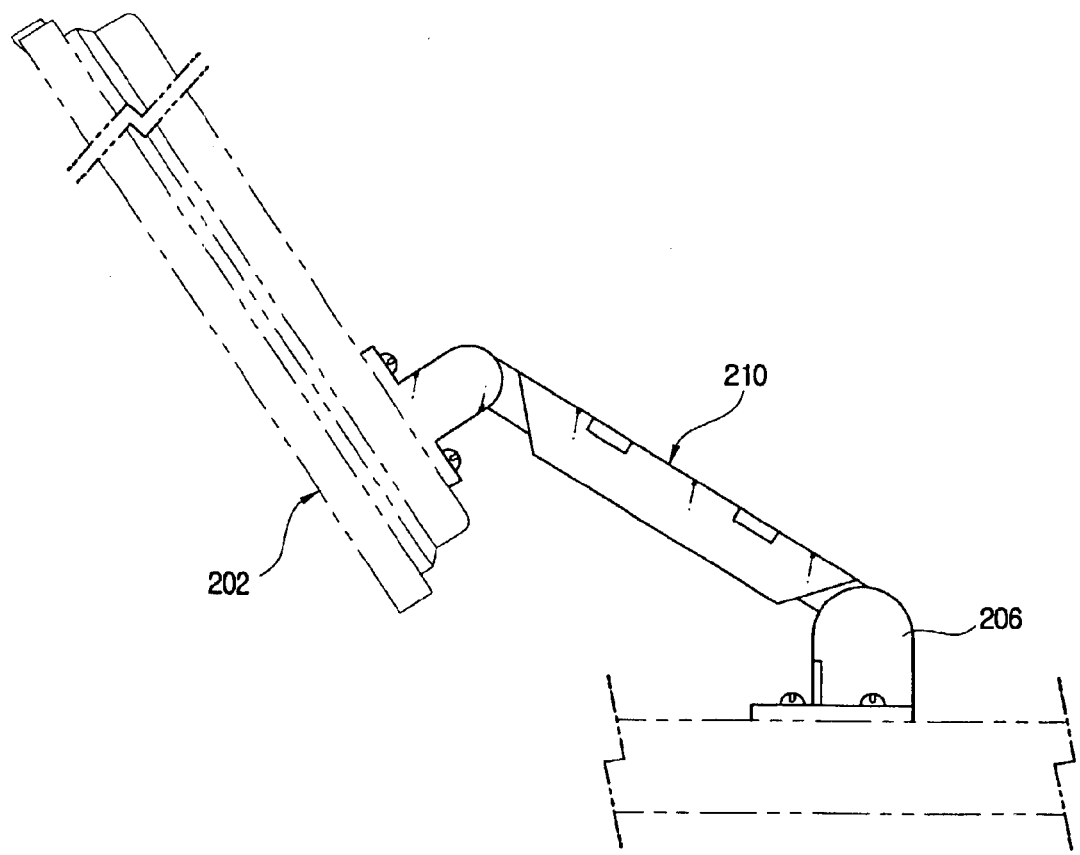

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

The present invention will be described below with reference to the accompanying drawings.

Figure 3:
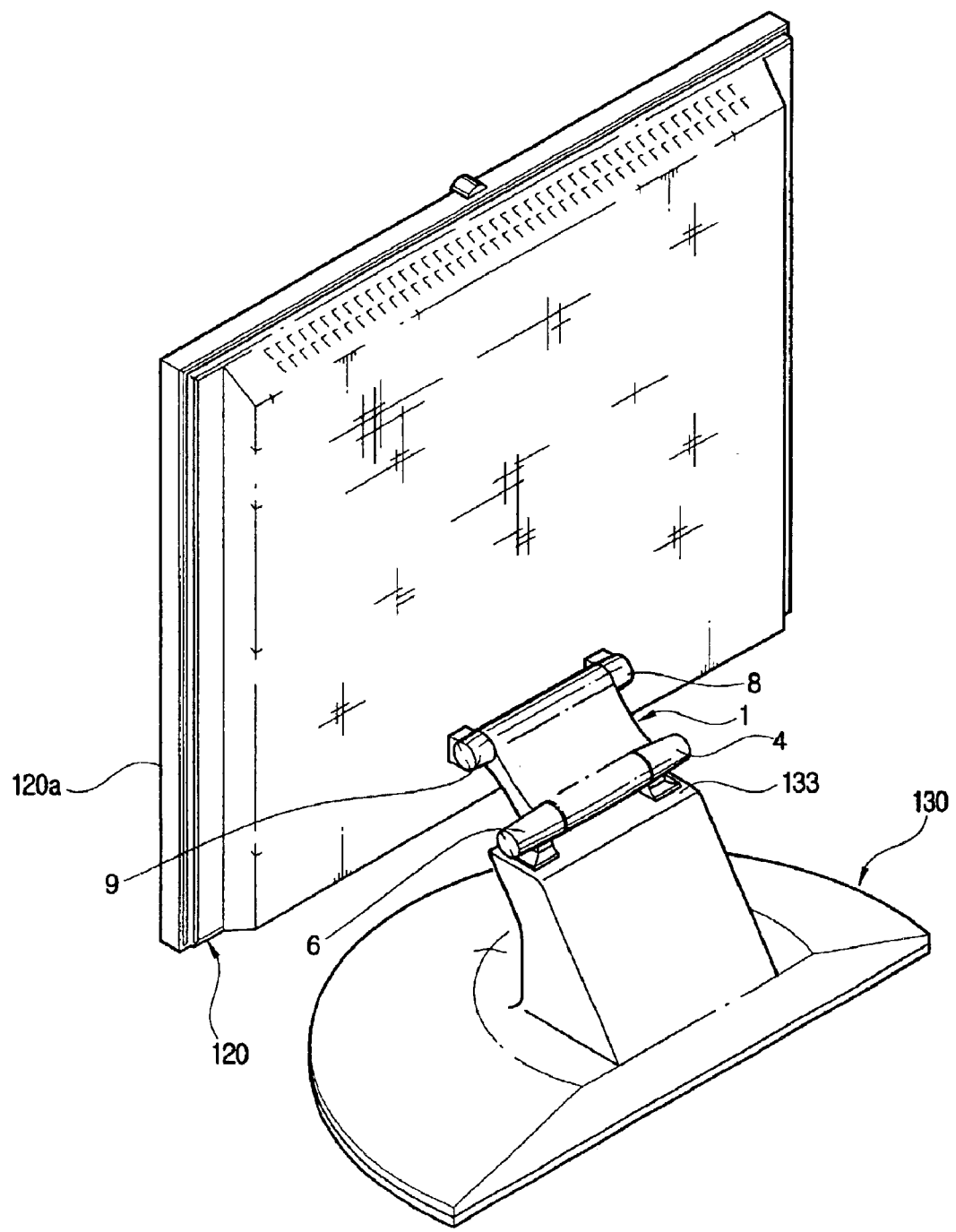
FIG. 3 is a rear perspective of a monitor according to an embodiment of the present invention.
Figure 4:
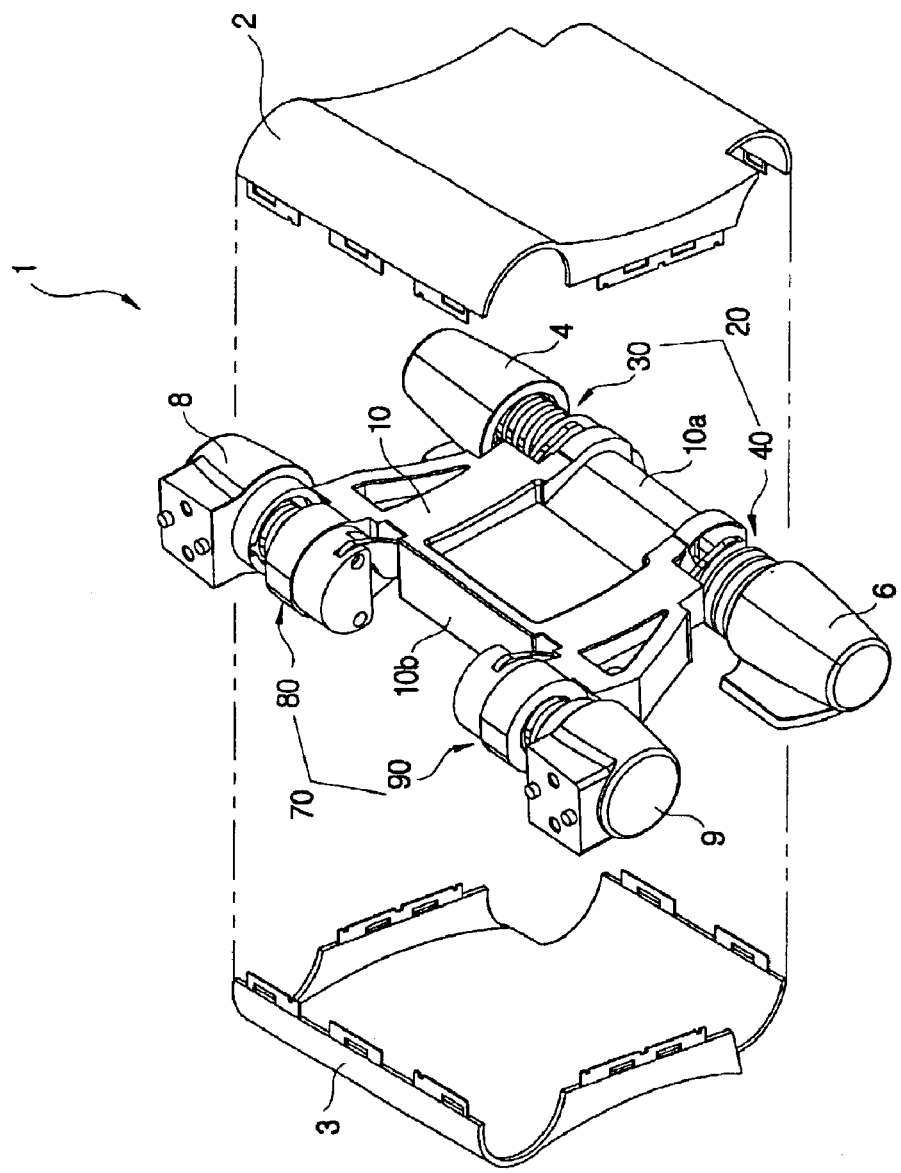
FIG. 4 is an exploded perspective view showing a part of a link assembly of the monitor shown in FIG. 3.
Figure 5:
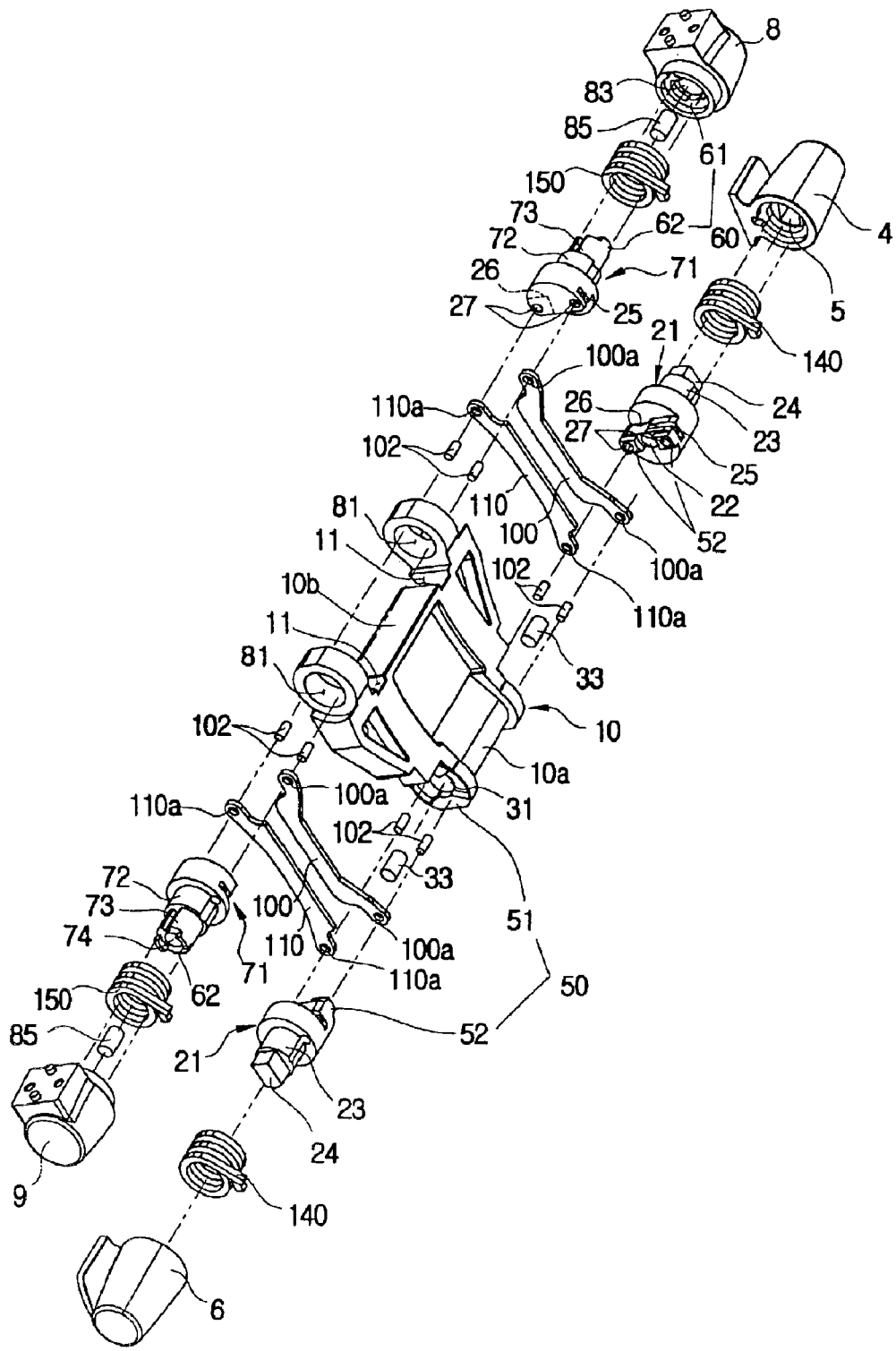
FIG. 5 is an exploded perspective view of the link assembly shown in FIG. 4.

A monitor according to an embodiment of the present invention, as illustrated in FIGS. 3 through 5, includes a base member 130 disposed on a predetermined installation surface, a monitor body 120 provided with a displaying surface 120a on which a picture is displayed, and a link assembly 1 connected between the base member 130 and the monitor body 120.

In a left side of the link assembly 1 are formed a second base bracket 6 and a second monitor bracket 9 (to be described in detail later). A first base bracket 4 and a first monitor bracket 8 (to be described in detail later) are formed in a right side of the link assembly 1. The left and the right sides of the link assembly 1 are symmetrical to each other. Thus, drawings and detailed description for some elements in symmetrical configuration will be avoided hereinbelow, as necessary.

The link assembly 1 includes a link member 10 disposed between a rear surface of the monitor body 120 and a base supporting part 133 of the base member 130, an upper cover 2 disposed on an upper side of the link member 10, a lower cover 3 disposed on a lower side of the link member 10, a base hinge 20 connecting a lower end 10a of the link member 10 with the base member 130 to be tilted with respect to the base member 130, and a monitor hinge 70 connecting an upper end 10b of the link member 10 with the monitor body 120 in a tiltable manner. The tilting manner means that two adjacent elements rotate or are tilted with respect to each other. For example, the monitor body 120 is rotatably or tiltably connected to the link member 10 to rotate or be tilted with respect to the link member 10, and the link member 10 is rotatably or tiltably connected to the base member 130 to rotate or be tilted with respect to the base member 130.

The monitor includes first and second assistant link members 100 and 110 transmitting a tilting movement of the link member 10 relative to the base member 130 to the monitor body 120, a first torsion coil spring 140 elastically biasing the link member 10 and the base member 130 in opposite directions when the link member 10 is downward tilted to a plane of the base member 130, and a second torsion coil spring 150 elastically biasing the link member 10 and the monitor body 120 in opposite directions when the monitor body 120 is downward tilted to a plane of the link member 10. According to one aspect, as shown in FIGS. 5, 7A, 7B, 9A, and 9B, the first and second assistant link members 100 and 110 are disposed parallelly.

The link member 10 is tilted within a predetermined range of a first tilting angle relative to the base member 130. For example, the first tilting angle can be in a range of 0° C. to 65° C., thereby allowing the monitor to be designed in compliance with different limitations applied in respective countries.

On an upper side of the base member 130 is formed the base supporting part 133 bolt-coupled with the first and second base brackets 4 and 6.

The base hinge 20 is coupled to the first and second base brackets 4 and 6 formed on the base supporting part 133 of the base member 130 at a predetermined interval. The base hinge 20 includes first and second base hinge parts 30 and 40 connecting both sides of the lower end 10a of the link member 10 to the corresponding first and second base brackets 4 and 6 to be tilted with respect to the base member 130.

Respective inside ends of the first and second base brackets 4 and 6, which are opposite to each other, include depressed boss receiving parts 5 having a non-circular section to receive corresponding boss parts 24 of first link supporting parts 21 (to be described in detail later).

Each of the first and second base hinge parts 30 and 40 includes a first pin receiving part 31 formed in a corresponding one of opposite sides of the lower end 10a of the link member 10, the first link supporting part 21 having the boss part 24 provided at one end thereof, the boss part 24 having a non-circular section fitted to the first base bracket 4 or the second base bracket 6, the first link supporting part 21 having a second pin receiving part 22 provided at the other end thereof and depressed with a circular section, and a first hinge pin 33 having a first end inserted into the first pin receiving part 31 in the tiltable manner and a second end fixedly inserted into the second pin receiving part 22. The first link supporting part 21 has a first spring supporting part 23 having a circular section to receive the first torsion coil spring 140 when the boss part 24 is connected to the boss receiving part 5. The non-circular sectioned boss parts 24 of the first link supporting part 21 are fitted to corresponding ones of the boss receiving parts 5 of the first and second base brackets 4 and 6.

The first torsion coil springs 140 are respectively received in the first spring supporting parts 23 of the first link supporting parts 21 respectively provided in the first and second base hinge parts 30 and 40. One end of each first torsion coil spring 140 is coupled to the link member 10, and the other end is coupled to a corresponding one of the first and second base brackets 4 and 6. The pair of the first torsion coil springs 140 are elastically biasing the link member 10 and the base member 130 in opposite directions when the link member 10 is downward tilted to the plane of the base member 130. A strength of an elastic force of the first torsion coil spring 140 is less than the elastic force for returning the link member 10 to its original position where a pressing force exerted on the link member 10 is eliminated under a condition that the link member 10 is downward tilted to a plane of the base member 130. Under this state shown in FIG. 3, a user can gradually tilt up the link member 10 from the plane of the base member 130 only with a small force, for example, the elastic force of the first torsion coil springs 140 provided in a pair.

Provided in the first and second base hinge parts 30 and 40 is a tilting angle limiting unit 50 limiting a first tilting angle of the link member 10 relative to the base member 130. The tilting angle limiting unit 50 is designed appropriately in compliance with a limited range of the first tilting angle, within which the link member 10 is tilted relative to the base member 130, as mentioned above.

The tilting angle limiting unit 50 includes a pair of first stoppers 51 radially formed around the first pin receiving part 31 so as to be opposite to each other at predetermined intervals and provided on both sides of the lower end 10a of the link member 10 wherein the pair of the first pin receiving parts 31 is formed, and a pair of first projection parts 52 selectively engaging each of the first stoppers 51 in response to a tiling orientation of the link member 10 and formed around an end of the second pin receiving part 22 coupled to the first hinge pin 33.

Where the link member 10 is forced downward relative to the plane of the base member 130, the link member 10 coupled to the pair of the first hinge pins 33 in the tiltable manner is tilted downward. When the link member 10 reaches a limiting point of the predetermined range of the first tiling angle during its downward tilting, one of the first stoppers 51 in a pair is caught to the first projection part 52 of the second pin receiving part 22, allowing the link member 10 not to be downward tilted any more.

To the contrary, where the link member 10 is forced upward relative to the base member 130, the link member 10 reaches the limiting point when the other side of the first stopper 51 is caught to the first projection part 52 during upward tilting of the link member 10 by the pair of first hinge pins 33, thereby blocking upward tilting thereof.

The range of the tilting angle of the link member 10 relative to the base member 130 can be designed in a uniform manner by the first tilting angle limiting unit 50 having the first projection part 52 and the first stopper 51 formed on the second pin receiving part 22. Thus, even if the limited range of the first tilting angle of the link member 10 is different country by country, the size of the first projection part 52 and the first stopper 51 can be designed appropriately in accordance with such a limitation.

To the upper end 10b of the link member 10 is coupled the monitor hinge 70 tilting the monitor body 120 relative to the link member 10 within a predetermined range of a second tilting angle. Like the base hinge 20, the monitor hinge 70 is also tilted within the predetermined range of the second tilting angle. For example, the second tilting angle can be in a range of −5° C. to 30° C., thereby allowing the monitor to be designed in compliance with different limitations applied country by country.

The monitor hinge 70 is coupled to the first and second monitor brackets 8 and 9 with a predetermined interval from the monitor body 120. Also, the monitor hinge 70 includes first and second monitor hinge parts 80 and 90 connecting opposite ends of the upper side 10b of the link member 10 to the first and second monitor brackets 8 and 9 in the tiltable manner.

Each of the first and second monitors 80 and 90 includes a hinge inserting hole 81 formed at one side of the upper end 10b of the link member 10, a third pin receiving part 83 having a circular section depressed on one end of the first and second monitor brackets 8 and 9, a second link supporting part 71 having one end coupled to one of the first and second monitor brackets 8 and 9 and the other end tiltably inserted into the hinge inserting hole 81, and a second hinge pin 85 having a first end inserted into a fourth pin receiving part 74 of the second link supporting part 71 (to be described in detail later) and a second end fixedly inserted into the third pin receiving part 83.

The second link supporting part 71 has a hinge inserting part 72 inserted into a hinge inserting hole 81 in the tiltable manner, a second spring supporting part 73 provided on one side of the hinge inserting part 72 to support the second torsion coil spring 150, a fourth pin receiving part 74 provided in one side of the second spring supporting part 73 and depressed to form a circular section disposed to face the third pin receiving part 83. Since the first end of the second hinge pin 85 is inserted into the fourth pin receiving part 74 of the second link supporting part 71 in the tiltable manner and since the other end thereof is fixedly inserted into the third pin receiving part 83 of the first and second monitor brackets 8 and 9 by pressure, the monitor body 120 can tilt against the link member 10.

The second torsion coil spring 150 is provided in each of the second spring supporting parts 73 of the second link supporting parts 71, and one side of the second torsion coil spring 150 is supported by the second link supporting part 71 and the other side thereof is supported by a corresponding one of the first and second monitor brackets 8 and 9. The second torsion coil spring 150 elastically biases the link member 10 and the monitor body 120 in opposite directions when the monitor body 120 is tilted downward to a plane of the link member 10. Where a pressing force exerted on the monitor body 120 is eliminated under a condition that the monitor body 120 is forced so as to be tilted downward to the plane of the link member 10, a strength of an elastic force of the second torsion coil spring 150 is less than the elastic force for returning the monitor body 120 to its original position. Under this state shown in FIG. 3, a user can gradually tilt up the monitor body 120 to the plane of the link member 10 with a little weak force, for example, the elastic force of the second torsion coil springs 150 provided in a pair.

In each of the first and second monitor hinge parts 80 and 90, the first end of the second hinge pin 85 is coupled to the fourth pin receiving part 74 of the second link supporting part 71 in the tiltable manner, and the second end thereof is fixedly inserted into one of the third pin receiving parts 83 of the first and second monitor brackets 8 and 9. The second hinge pin 85 and the fourth pin receiving pat 74 of the second link supporting part 71 are coupled in the tiltable manner, but a frictional force is generated therebetween by the coupling. This frictional force should be stronger than a force difference between a torque generated by a weight of the monitor body 120 and the elastic force which the pair of second torsion coil springs 150 apply to the link member 10. Thus, the monitor body 120 is not downward tilted relative to the link member 10 by the weight thereof, and the monitor body 120 can be tilted relative to the link member 10 only when the monitor body 120 is forced as predetermined.

The hinge inserting part 72 of the second link supporting part 71 is inserted into the hinge inserting hole 81 provided in the upper end 10b of the link member 10 in the tiltable manner. The hinge inserting part 72 of the second link supporting part 71 is tilted by the assistant link members 100 and 110 coupled to the second link supporting part 71 relative to the hinge inserting hole 81.

In the first and second monitor hinge parts 80 and 90 is provided a monitor angle limiting unit 60 limiting the second tilting angle of the monitor body 120 relative to the link member 10. The monitor angle limiting unit 60 is designed appropriately in compliance with the limited range of the second tilting angle within which the monitor body 120 is tilted relative to the link member 10.

The monitor angle limiting unit 60 includes a pair of second stoppers 61 radially formed around the third pin receiving part 83 so as to be opposite to each other at a predetermined interval in the first and second monitor brackets 8 and 9, and a pair of second projection parts 62 formed on one end of the second link supporting part 71 formed with the fourth pin receiving part 74 to be selectively engaged with each of the second stoppers 61 in response to a tilting direction of the monitor body 120.

Where the monitor body 120 is forced downward relative to the plane of the link member 10, the monitor body 120 coupled to the pair of second hinge pins 85 in the tiltable manner is tilted downward. If the monitor body 120 reaches the limiting point of the predetermined range of the second tiling angles during downward tilting, one of the second stoppers 61 is caught by one of the second projection parts 62 of the third pin-receiving part 83 to allow the monitor body 120 not to be downward tilted any more.

To the contrary, where the monitor body 120 is forced upward relative to the link member 10, the monitor body 120 reaches the limiting point when the other side of the second stopper 61 is caught on the other second projection part 62 while the monitor body 120 is tilted upward by the pair of second hinge pins 85, thereby blocking upward tilting thereof.

The range of the second tilting angle of the monitor body 120 relative to the link member 10 is determined by the monitor angle limiting unit 60 having the first projection parts 62 and the second stoppers 61. Thus, even if the range of the second tilting angle of the monitor body 120 is different country by country, the second projection parts 62 and the second stoppers 61 can be designed appropriately in accordance with the different range of the second tilting angle.

In the present invention, there are provided the first and second assistant link members 100, 110 transmitting a first rotation movement of the link member 10 relative to the plane of the base member 130 to the monitor body 120. The first and second assistant link members 100, 110 are constructed so that the monitor body 120 is tilted at a predetermined angle in conjunction with a tilting movement of the link member 10 relative to the plane of the base member 130. The pair of first and second assistant link members 100 and 110 are disposed in each of the link member receiving parts 11 depressed in both side edges of the link member 10 to form a "U" shape to receive respective ones of the first and second assistant link members 100, 110.

The first and second assistant link members 100 and 110 have a form of a crooked bar shape to be coupled to the first link supporting part 21 and the second link supporting part 71 at a predetermined interval. In each of the first link supporting part 21 and the second link supporting part 71 are formed first and second assistant link supporting parts 25 and 26 receiving the first and second assistant link members 100 and 110 at a predetermined interval, and a pair of pin inserting holes 27 coupling the first and second assistant link members 100 and 110 to the first and second assistant link receiving parts 25 and 26, respectively.

The first and second assistant link members 100 and 110 can be installed in the link member receiving part 11 by inserting a pair of link coupling pins 102 into respective ones of passing holes 100a, 110a under a condition that the passing holes 100a and 110a formed on the first and second assistant link members 100 and 110 mutually communicate with the first and second assistant link receiving parts 25 and 26 formed in the first and second link support parts 21 and 71 in the tiltable manner. The pair of first and second assistant link members 100 and 110 coupled to the first and second link supporting parts 21 and 71 by the link coupling pins 102 can move within the link member receiving part 11 without interfering with each other.

Figure 6:
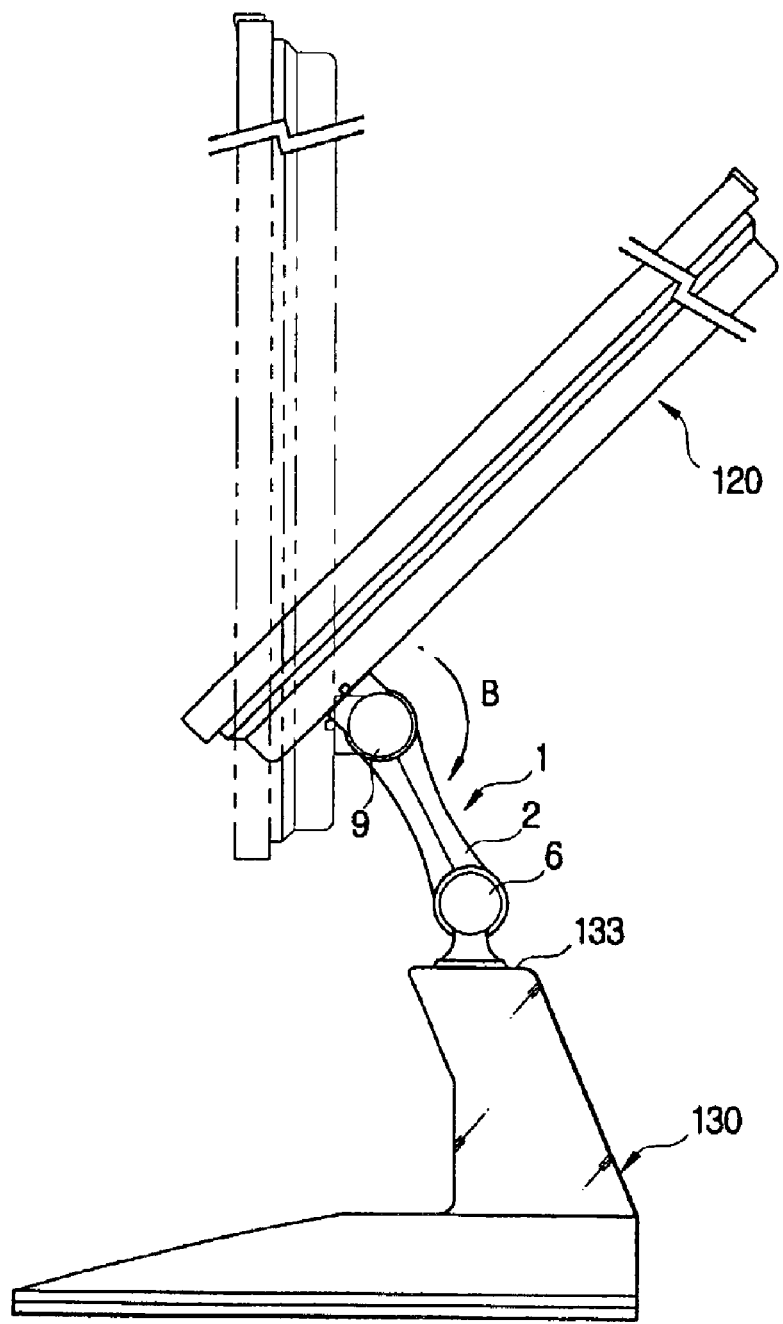
FIG. 6 is a side view showing a tilting movement of the monitor body in the monitor shown in FIG. 3.
Figure 7A:
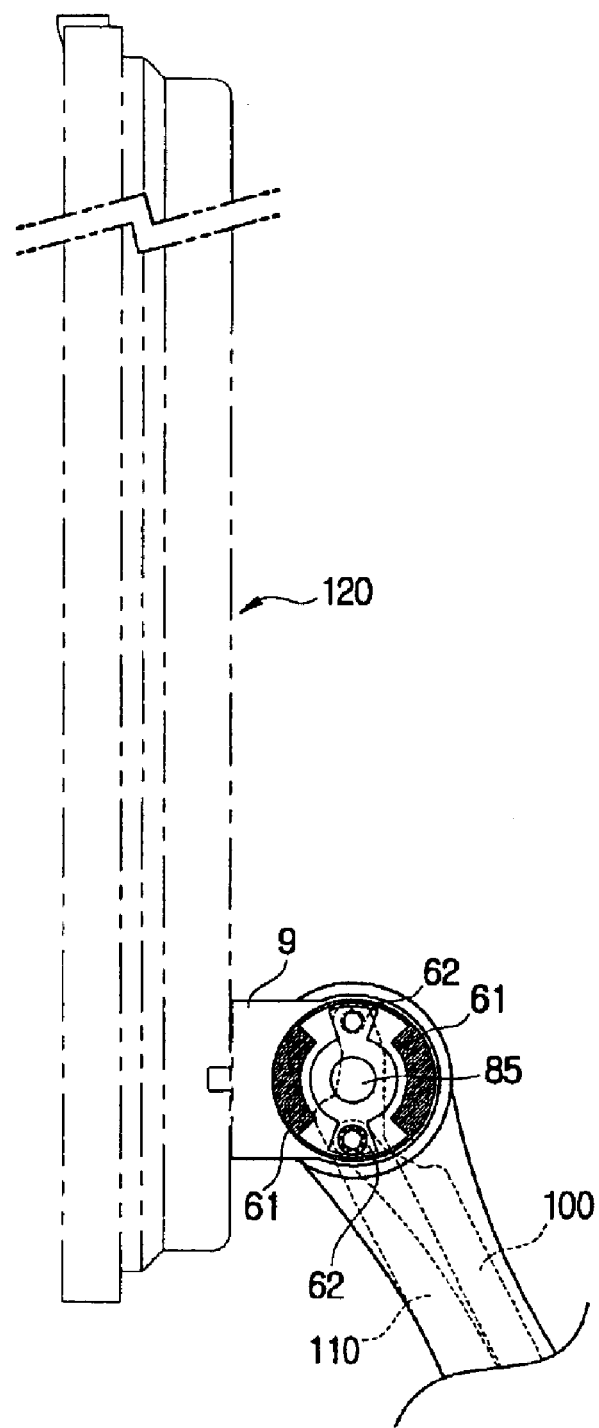
FIGS. 7A and 7B are partially enlarged side views of operational states of the monitor shown in FIG. 6.
Figure 7B:
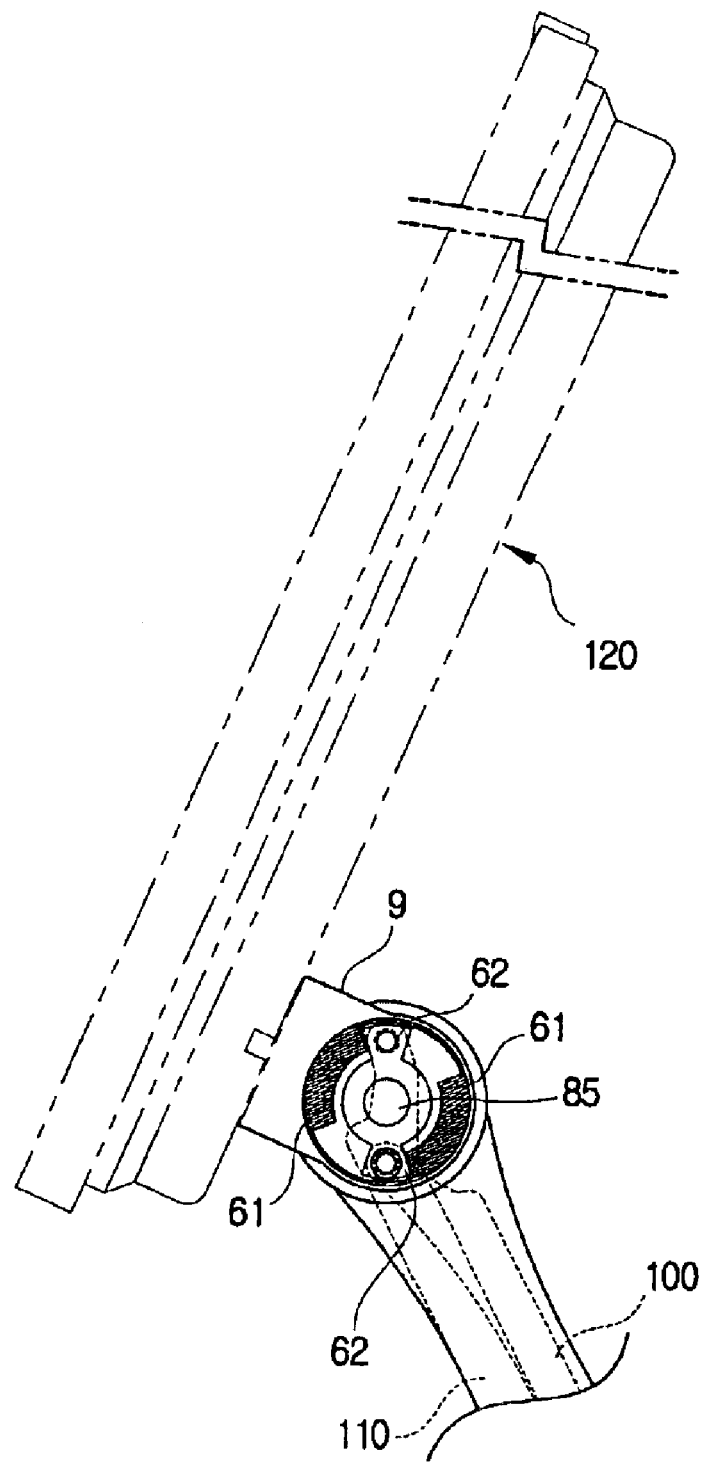

An operational process of each part of the monitor having the above-described configuration will be described. As depicted in FIGS. 6, 7A and 7B, the monitor body 120 is forced backward in an arrow direction B shown in FIG. 6 under a state that the monitor body 120 is positioned as shown in FIG. 3. The monitor body 120 is tilted backward relative to the link member 10 by the fourth pin receiving part 74 coupled to the pair of second hinge pins 85 in the tiltable manner. A user can tilt the monitor body 120 by the elastic force of the second torsion coil spring 150 provided between the first and second monitor brackets 8 and 9 with a little weak force. Since the link member 10 is not tilted, the first and second assistant link members 100 and 100 connected to the first and second link supporting parts 21 and 71 cannot be tilted, and in response, the second projection parts 62 provided in the second link supporting part 71 is also not rotated. The monitor body 120 tilted backward by the second hinge pin 85 reaches the limiting point where the second stopper 61 reaches the second projection part 62, thereby blocking tilting of the monitor body 120 (see FIGS. 7A and 7B). Where the monitor body 120 is tilted forward to the link member 10, the process therefor is reverse to the above-described process; and thus a repetitive description thereof will be avoided.

Figure 8:
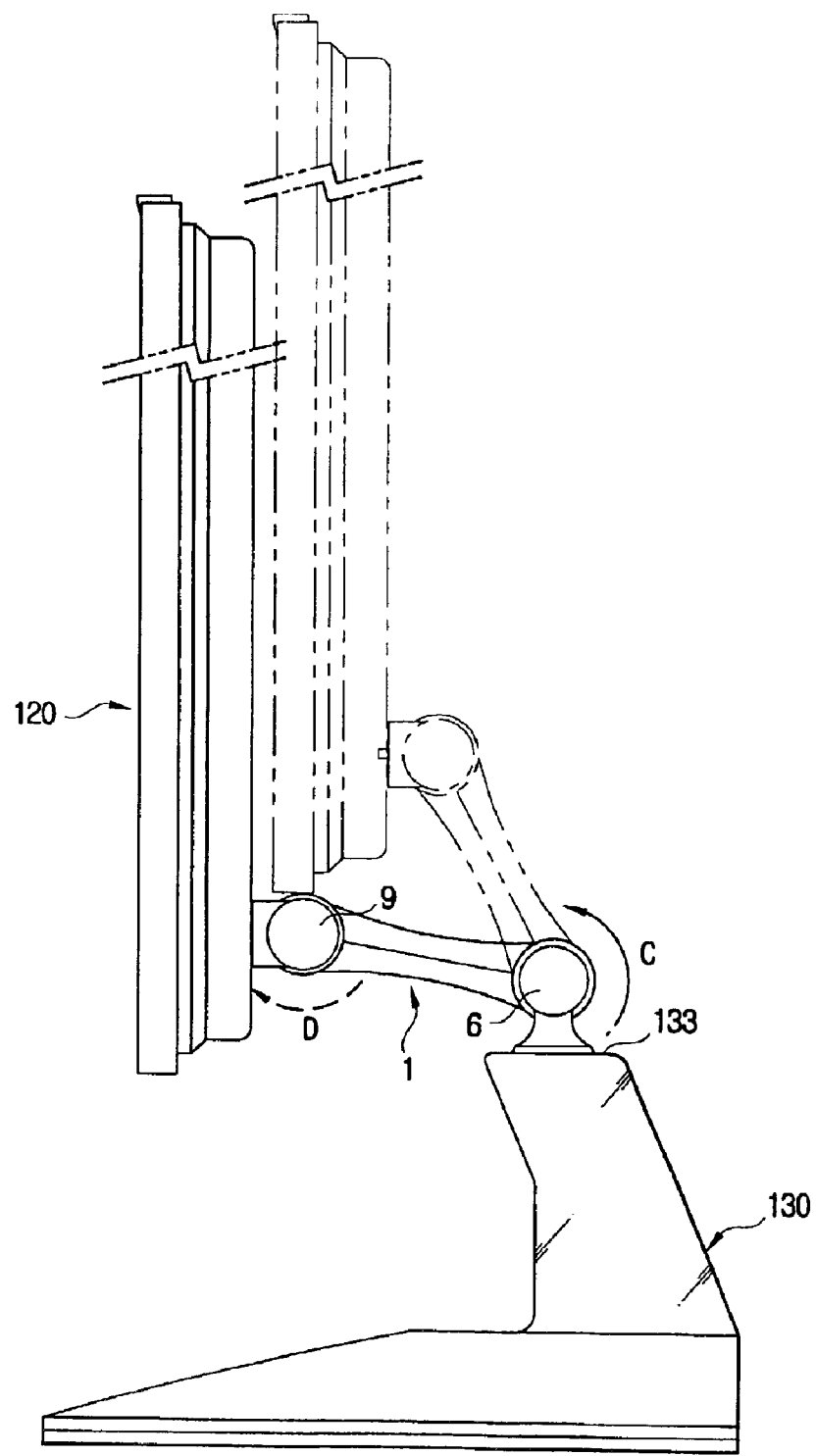
FIG. 8 is a side view showing a tilting link member of the monitor shown in FIG. 3.
Figure 9A:
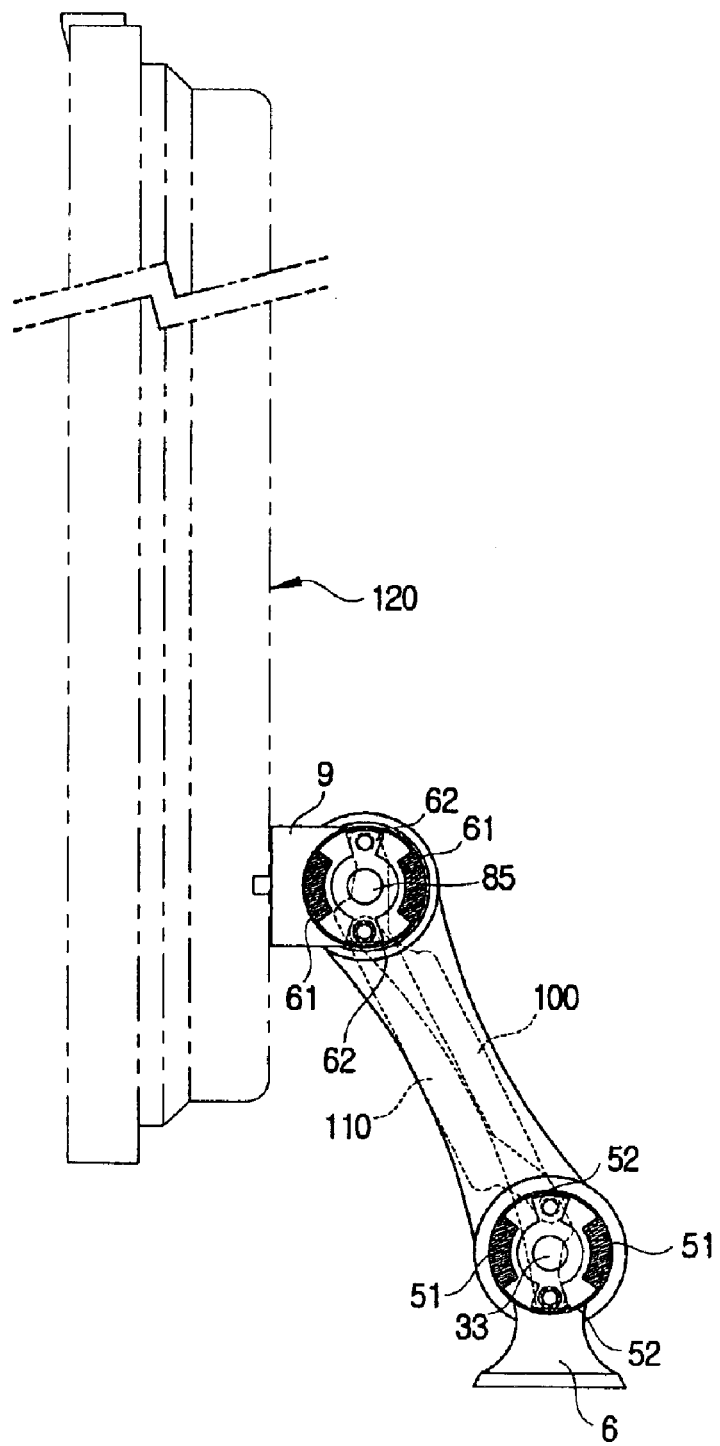
FIGS. 9A and 9B are partially enlarged side views of the monitor according to its operation states shown in FIG. 8.
Figure 9B:
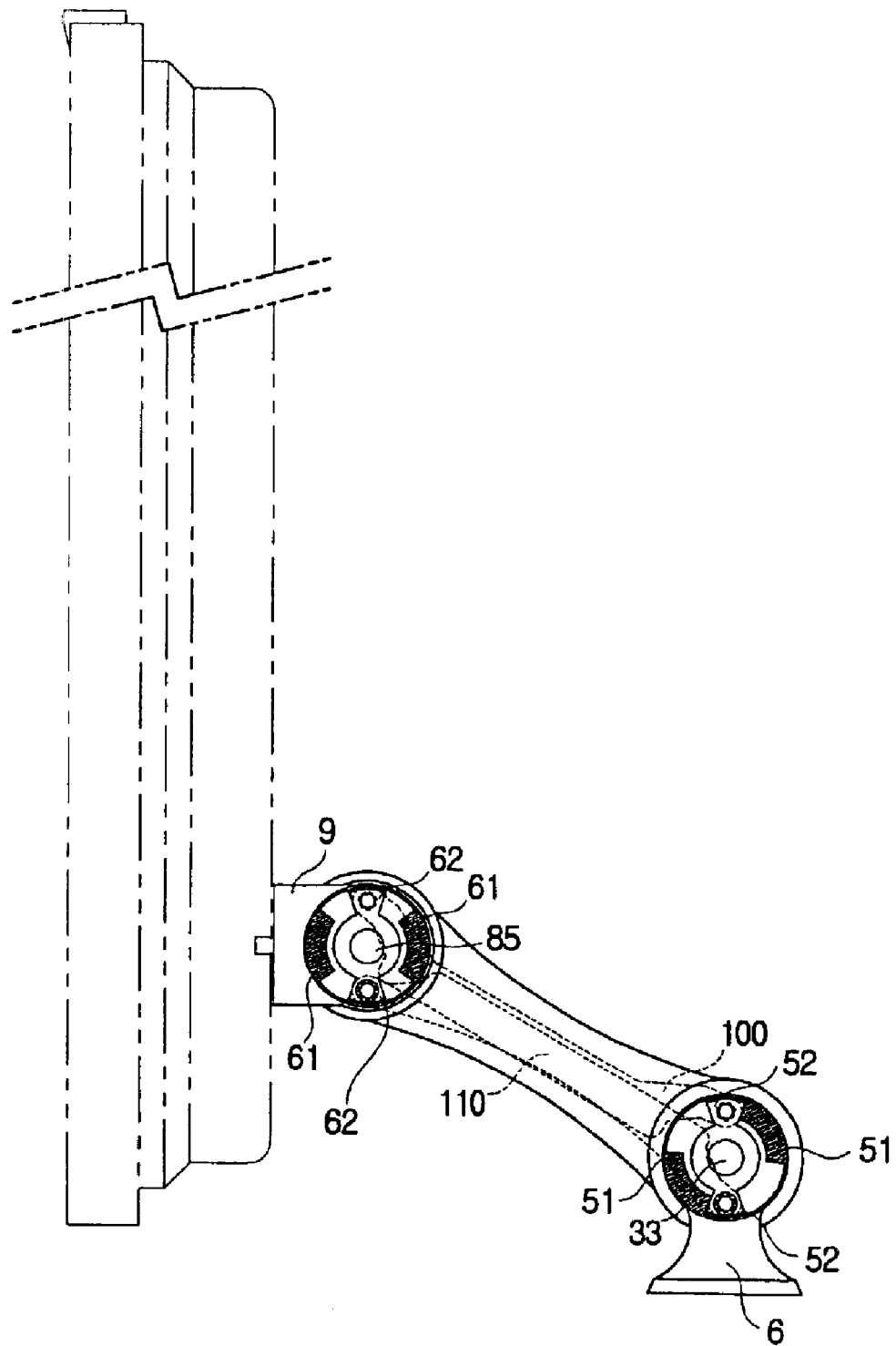

As shown in FIGS. 8, 9A and 9B, the link member 10 is forced forward in an arrow direction C in FIG. 8 under the state that the monitor is placed as shown in FIG. 3. The link member 10 is tilted forward about the pair of first hinge pins 33. A user can forwardly tilt the link member 10 by the elastic force of the first torsion coil spring 140 provided between the first and second base brackets 4 and 6, with a little force.

If the link member 10 is tilted forward, the second link supporting part 71 provided to the upper end 10b of the link member 10 is tilted or rotated in a clockwise direction D to the predetermined degree of angle by the first and second assistant link members 100 and 110. The tilting movement of the second link supporting part 71 is transmitted to the second hinge pin 85, and the monitor body 120 is tilted to the predetermined degree of angle by tilting the first and second monitor brackets 8 and 9. A viewing degree of angle of the monitor initially set up by a user (see FIG. 9A) can be maintained by tilting the monitor body 120 (see FIG. 9B). This is because the fourth pin receiving part 74 of the second link supporting part 71 is coupled to the second hinge pin 85 in the tiltable manner, but some frictional force is generated therebetween by the coupling of the fourth pin receiving part 74 and the second hinge pin 85. The link member 10 coupled to the pair of first hinge pins 33 in the tiltable manner is not forwardly tilted any more because the first stopper 51 is caught to the first projection part 52 if the link member 10 reaches the limiting point of the range of allowable tilting angle during forward tilting of the link member 10 (see FIGS. 9A and 9B). Also, where the link member 10 is tilted backward to the base member 130, the process therefor is reverse to the above-described process, and therefore, repetitive description thereof will be avoided.

In the above-described embodiment, the first torsion coil springs 140 are respectively provided in the first and second base hinge parts 30 and 40, but only one of the torsion coil springs 140 may be provided in one of the first and second base hinge parts 30 and 40. Also in an above-described embodiment, the second torsion coil springs 150 are respectively provided in the first and second monitor hinge parts 80 and 90, but only one of the second torsion coil springs 150 can be provided in one of the first and second monitor hinge parts 80 and 90.

In the above-described embodiment, the tilting angle limiting units 50 limiting the first tilting angle of the link member 10 are respectively provided in the first and second base hinge parts 30 and 40, but only one of the tilting angle limiting units 50 may be provided in only one of the first and second base hinge parts 30 and 40. Also in the above-described embodiment, the monitor angle limiting units 60 limiting the second tilting angle of the monitor body 120 are respectively provided in the first and second monitor hinge parts 80 and 90, but only one of the monitor angle limiting units 60 can be provided in only one of the first and second monitor hinge parts 80 and 90.

In the above-described embodiment, the first and second assistant link members 100 and 110 transmitting the tilting movement of the link member 10 to the tilting movement of the monitor body 120 are provided in a pair and disposed in both side edges of the link member 10, but the first and second assistant link members 100, 110 can also be provided in only one of the side edges of the link member 10.

As described above, the monitor according to the present invention is provided with the link member between the monitor body and the base member. The link member includes the monitor hinge on the upper end of the link member and the base hinge on the lower end of the link member, so that the user can adjust the height and the viewing angle of the monitor body. The monitor according to the present invention is further provided with the first and second assistant link members provided in a pair and disposed in both sides of the link member to connect the monitor hinge to the base hinge, the pair of first torsion coil springs between the link member and the base member, and the pair of second torsion coil springs between the monitor body and the link member, so that the user can adjust the height and the viewing angle of the monitor body even in a case of a large-sized monitor body. When the user adjust the first tilting angle to control the height of the monitor body, the link member can maintain the viewing angle of the monitor body which has been initially set up by the user. The viewing angle is defined by an angle formed between the monitor body and the base member or the user.

The monitor according to the present invention is further provided with the tilting limiting unit and the monitor angle limiting unit, thereby being able to adjust a degree of the first tilting angle and the second tilting angle of the monitor body appropriately with respect to the base member.

As described above, in the monitor according to the present invention, the height and the viewing angle of the monitor body can be freely adjusted. Even in the large-sized monitor body, the height and viewing angle thereof can be easily adjusted and the viewing angle of the monitor body can be maintained as initially set up by the user when the height of the monitor body is adjusted.

In addition, the degree of the viewing angle of the monitor body can be adjusted appropriately with respect to the base member.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitor having a monitor body and a base member supporting the monitor body, comprising:
    a link assembly having a link member disposed between the monitor body and the base member;
    a base hinge connecting a first end of the link member with the base member in a tiltable manner to control the link member to be tilted relative to the base member within a first angle;
    a monitor hinge connecting a second end of the link member with the monitor body in the tiltable manner about an axis, to control the link member to be tilted with respect to the monitor body within a second angle;
    an assistant link member transmitting a tilting movement of the link member relative to the base member to the monitor body about the axis;
    a first torsion coil spring elastically biasing the link member and the base member in opposite directions; and
    a second torsion coil spring elastically biasing the link member and the monitor body in opposite directions,
    wherein the assistant link member comprises first and second assistant link members, and
    the monitor body is movable about the axis without changing the first angle.

2. The monitor according to claim 1, wherein: the link assembly comprises
    a pair of first and second base brackets disposed at a predetermined interval to be coupled to the base member, and having boss receiving parts with a non-circular section formed on respective ends of the first and second base brackets, and
    first and second monitor brackets positioned in pair at a predetermined interval to be coupled to the monitor body;
    the base hinge comprises first and second base hinge parts connecting opposite sides of the first end of the link member respectively to the first and second base brackets in the tiltable manner; and
    the monitor hinge comprises first and second monitor hinge parts connecting opposite sides of the second end of the link member with the first and second monitor brackets in the tiltable manner.

3. The monitor according to claim 2, wherein the base hinge parts and the monitor hinge parts are respectively formed with link member receiving parts receiving the first and second assistant link members at a predetermined interval.

4. The monitor according to claim 3, wherein:
    the base hinge parts and the monitor hinge parts are respectively formed with a plurality of pin inserting holes formed at a predetermined interval; and
    the first and second assistant link members, at opposite ends thereof, have passing holes, each passing hole communicating with a corresponding one of the pin inserting holes and one of a plurality of link coupling pins is inserted into each of the passing holes and the corresponding pin inserting holes.

5. The monitor according to claim 1, wherein the link member comprises:
    a link member receiving part with a "U" shape to receive the first and second assistant link members.

6. The monitor according to claim 1, wherein the first and second assistant link members are respectively formed in pairs, and are provided in side edges of the link member.

7. A monitor having a monitor body and a base member supporting monitor body, comprising:
    a link assembly having a link member disposed between the monitor body and the base member;
    a base hinge connecting a first end of the link member with the base member in a tiltable manner to control the link member to be tilted relative to the base member within a first angle;
    a monitor hinge connecting a second end of the link member with the monitor body in the tiltable manner to control the link member to be tilted with respect to the monitor body within a second angle;
    an assistant link member transmitting a tilting movement of the link member relative to the base member to the monitor body;
    a first torsion coil spring elastically biasing the link member and the base member in opposite directions when the link member is tilted relative to the base member; and
    a second torsion coil spring elastically biasing the link member and the monitor body in opposite directions when the monitor body is tilted relative to the link member,
    wherein the link assembly comprises a pair of first and second base brackets disposed at a predetermined interval to be coupled to the base member and boss receiving parts with a non-circular section formed on respective ends of the first and second base brackets,
    the base hinge comprises first and second base hinge parts connecting opposite sides of the first end of the link member respectively to the first and second base brackets in the tiltable manner, and
    each of the first and second base hinge parts comprises
        a first pin receiving part formed on a side of the first end of the link member;
        a first link supporting part including a boss part with the non-circular section fitted second pin receiving part with a circular section provided at the other end thereof; and to the boss receiving part of the first or second base bracket provided at one end thereof, and a
        a first hinge pin having a first end inserted into the first pin receiving part in the tiltable manner and a second end fixedly inserted into the second pin receiving part.

8. The monitor according to claim 7, wherein the first link supporting part comprises a first spring supporting part supporting the first torsion coil spring, and the first torsion coil spring is supported by the link member at one end thereof and by the first or second base bracket at the other end thereof.

9. The monitor according to claim 7, wherein the link member comprises a tilting angle limiting unit provided in one of the first and second base hinge parts to limit a tilting angle of the link member relative to the base member.

10. The monitor according to claim 9, wherein the tilting angle limiting unit comprises:
   a pair of first stoppers provided in opposite sides of the lower end of the link member and formed around the first pin receiving part in a radial direction of the first pin receiving part to be spaced-apart from each other; and
   a pair of first projection parts provided in the first link supporting part and formed around the second pin receiving part to be selectively caught by the respective first stoppers according to a tilting direction of the link member.

11. A monitor having a monitor body and a base member supporting the monitor body, comprising:
   a link assembly having a link member disposed between the monitor body and the base member;
   a base hinge connecting a first end of the link member with the base member in a tiltable manner to control the link member to be tilted relative to the base member within a first angle;
   a monitor hinge connecting a second end of the link member with the monitor body in the tiltable manner to control the link member to be tilted with respect to the monitor body within a second angle;
   an assistant link member transmitting a tilting movement of the link member relative to the base member to the monitor body;
   a first torsion coil spring elastically biasing the link member and the base member in opposite directions when the link member is tilted relative to the base member; and
   a second torsion coil spring elastically biasing the link member and the monitor body in opposite directions when the monitor body is tilted relative to the link member,
   wherein the link member comprises first and second monitor brackets positioned in pair at a predetermined interval to be coupled to the monitor body,
   the monitor hinge comprises first and second monitor hinge parts connecting opposite sides of the second end of the link member with the first and second monitor brackets in the tiltable manner, and
   each of the first and second monitor hinge parts comprises:
      a hinge inserting hole formed on a side of the upper end of the link member;
      a first pin receiving part with a circular section formed at one end side of the first and second monitor brackets;
      a second link support part having a hinge inserting part inserted into the hinge inserting hole in a tiltable manner, a second spring receiving part supporting the second torsion coil spring on one side of the hinge inserting part, a fourth pin receiving part with a circular section formed opposite to the third pin receiving part at one side of the second spring receiving part; and
      a second hinge pin having a first end inserted into the fourth pin receiving part in the tiltable manner and a second end fixedly inserted into the third pin receiving part.

12. The monitor according to claim 11, wherein the second torsion coil spring is supported by the second link supporting part at its one end, and by at least one of the first and second base brackets at its other end.

13. The monitor according to claim 11, wherein the link member comprises:
   a monitor angle limiting unit provided in at least one of the first and second monitor hinge parts to limit a tilting angle of the monitor body relative to the link member.

14. The monitor according to claim 13, wherein the monitor angle limiting unit comprises:
   a pair of second stoppers provided in at least one of the first or second monitor brackets and formed around the third pin receiving part in a radial direction of the third pin receiving part to be spaced-apart from each other; and
   a pair of second projection parts provided in at least one end of the second link support part and formed around the fourth pin receiving part to be selectively caught by the second stoppers according to the tilting direction of the monitor body.

15. A monitor having a monitor body and a base member supporting the monitor body, comprising:
   a link assembly rotatably connected between the monitor body and the base member to be tilted with respect to the base member to form a first angle with the base member and to be tilted about an axis with respect to the monitor body to form a second angle with the monitor body; and
   first and second assistant link members disposed in the link assembly to transmit a tilting movement between the link assembly and the base member to the monitor body about the axis in response to a change of the first angle, to change the second angle,
   the first assistant link member being parallelly disposed with respect to the second assistant link member, the first and second assistant link members each being connected at respective first ends thereof with the base member, and connected at respective second ends thereof with the monitor body,
   wherein the monitor body is movable about the axis without changing the first angle.

16. The monitor according to claim 15, wherein the monitor body is tilted with respect to the base member to form a viewing angle, and the viewing angle is not changed when the first and second angles are changed in response to the tilting movement of the link assembly.

17. The monitor according to claim 15, wherein the link assembly comprises:
   a first torsion spring disposed in the link assembly to elastically bias the link assembly and the base member when the link assembly is tilted with respect to the base member; and
   a second torsion spring disposed in the link assembly to elastically bias the link assembly and the monitor body when the monitor body is tilted with respect to the link assembly.

18. The monitor according to claim 17, wherein the link assembly further comprises:
   a base bracket fixedly connected to the base member;
   a monitor bracket fixedly connected to the monitor body,
   wherein the link member is connected to the base bracket through the first torsion spring and connected to the monitor body through the second torsion spring.

19. The monitor according to claim 18, wherein the link member comprises:
   a link member receiving part receiving the first and second assistant link members.

20. A monitor having a monitor body and a base member supporting the monitor body, comprising:
- a link assembly rotatably connected between the monitor body and the base member to be tilted with respect to the base member to form a first angle with the base member and to be tilted with respect to the monitor body to form a second angle with the monitor body; and
- first and second assistant link members disposed in the link assembly to transmit a tilting movement between the link assembly and the base member to the monitor body in response to a change of the first angle, to change the second angle,
- wherein the link assembly comprises
  - a first torsion spring disposed in the link assembly to elastically bias the link assembly and the base member when the link assembly is tilted with respect to the base member,
  - a second torsion spring disposed in the link assembly to elastically bias the link assembly and the monitor body when the monitor body is tilted with respect to the link assembly
  - a base bracket fixedly connected to the base member,
  - a monitor bracket fixedly connected to the monitor body,
  - a link member connected to the base bracket through the first torsion spring and connected to the monitor body through the second torsion spring,
  - a pair of base hinges each having a first link supporting part connected to the first and second assistant link members and connected to the base member through the first torsion spring, and
  - a pair of monitor hinges each having a second link supporting part connected to the first and second assistant link members and connected to the monitor body through the second torsion spring, and
- the link member comprises a link member receiving part receiving the first and second assistant link members.

21. A monitor having a monitor body and a base member supporting the monitor body, comprising:
- a link assembly rotatably connected between the monitor body and the base member to be tilted with respect to the base member to form a first angle with the base member and to be tilted with respect to the monitor body to form a second angle with the monitor body; and
- first and second assistant link members disposed in the link assembly to transmit a tilting movement between the link assembly and the base member to the monitor body in response to a change of the first angle, to change the second angle,
- wherein the link assembly comprises
  - a first torsion spring disposed in the link assembly to elastically bias the link assembly and the base member when the link assembly is tilted with respect to the base member,
  - a second torsion spring disposed in the link assembly to elastically bias the link assembly and the monitor body when the monitor body is tilted with respect to the link assembly,
  - a base bracket fixedly connected to the base member,
  - a monitor bracket fixedly connected to the monitor body,
  - a link member connected to the base bracket through the first torsion spring and connected to the monitor body through the second torsion spring,
  - a base hinge having a first link supporting part rotatably disposed in a first end of the link member, the first link supporting part connected to first ends of the first and second assistant link members and connected to the base member through the first torsion spring, and
  - a monitor hinge having a second link supporting part rotatably disposed in a second end of the link member, the second link supporting part connected to second ends of the first and second assistant link members and connected to the monitor body through the second torsion spring, and
- the link member comprises a link member receiving part receiving the first and second assistant link members.

22. The monitor according to claim 21, wherein the link assembly comprises:
- a tilting angle limiting unit disposed between the first link supporting part and the first end of the link member to limit a first rotation angle of the first link supporting part corresponding to the first angle of the base member with respect to the link member.

23. The monitor according to claim 22, wherein the link assembly comprises:
- a monitor angle limiting unit disposed between the second link supporting part and the monitor bracket to limit a second rotation angle of the second link supporting part corresponding to the second angle of the link member with respect to the monitor bracket.

24. The monitor according to claim 23, wherein the link assembly comprises a cover covering the base hinge, the monitor hinge, the tilting angle limiting unit, and the monitor angle limiting unit, and the base bracket and the monitor bracket protrude from the cover to be coupled to the base member and the monitor body, respectively.

25. The monitor according to claim 21, wherein the first link supporting part comprises:
- a first projection part rotatably disposed in the first end of the link member;
- a boss part extended from the projection part toward the base bracket; and
- a spring supporting part formed on the boss part to be connected to the first torsion spring.

26. The monitor to claim 25, wherein the base bracket comprises a boss receiving part, the first supporting part is inserted into the boss receiving part of the base bracket, and the first torsion spring connected between the spring supporting part of the first link supporting part and the boss receiving part of the base bracket when the boss part is inserted into the boss receiving part of the base bracket.

27. The monitor according to claim 25, wherein the link member comprises a first pin receiving part and a hinge pin, and the first link supporting part comprises a second pin receiving part, the hinge pin inserted into the first pin receiving part and the second pin receiving part.

28. The monitor according to claim 27, wherein the link member comprises:
- a tilting angle limiting unit having a first stopper formed around the first pin receiving part, and the first projection part of the first link supporting part contacts the first stopper to limit a rotation angle of the first link supporting part with respect to the link member.

29. The monitor according to claim 28, wherein the first and second assistant link members comprises a pair of first link coupling pins, and the first link supporting part comprises:
- a pair of coupling pin receiving holes receiving corresponding ones of the first link coupling pins to transmit the tilting movement of the link assembly with respect to the base member to the first and second assistant members through the base bracket, the first resilient member, the first link supporting part, and the first link coupling pins.

30. The monitor according to claim 29, wherein the first and second assistant link members comprises a pair of second link coupling pins, and the second link supporting part comprises:

a pair of second coupling pin receiving holes to be coupled to corresponding ones of the second link coupling pins to transmit the tilting movement of the link assembly with respect to the base member to the monitor body through the first and second assistant link members, the second link coupling pins, the second link supporting part, the second torsion spring, and the monitor bracket.

31. The monitor according to claim 30, wherein each of the first and second assistant link members has a crooked bar shape, and the first link coupling pins and the second link coupling pins are formed on respective opposite ends of the first and second assistant link members.

32. The monitor according to claim 30, wherein the monitor bracket comprises a third pin receiving part, and the second link supporting part comprises:

a second spring supporting part having a second projection part inserted into the third pin receiving part when the second torsion spring is coupled between the monitor bracket and the second link supporting part.

33. The monitor according to claim 30, wherein the link assembly comprises a monitor angle limiting unit having a second stopper formed on the monitor bracket, and the second link supporting part comprises:

a protrusion selectively contacting the second stopper of the monitor angle limiting unit to limit a rotation angle of the monitor body with respect to the link assembly.

34. A monitor having a monitor body and a base member supporting the monitor body, comprising:

a link assembly having a link member disposed between the monitor body and the base member;

a base hinge connecting a first end of the link member with the base member in a titlable manner about a first rotational axis to control the lik member to be titled relative to the base member within a first angle;

a monitor hing connecting a second end of the lik member with the monitor body in the tiltable manner about a second rotational axis to control the link member to be tilted with respect to the monitor body within a second angle; and a plurality of assistant link members transmitting a tilting movement of the link member relative to the base member to the monitor body about the second rotational axis, wherein the monitor body is movable about the second rotational axis without changing the first angle.

35. The monitor according to claim 34, wherein each of the base hinge and the monitor hinge comprise:

at least one hinge pin disposed to be titably rotated by predetermined friction.

36. The monitor according to claim 34, wherein each of assistant link members are formed in pairs, and are provided in a side edge of the link member.

37. The monitor according to claim 34, wherein:

the base hinge comprises first and second base hinge parts connecting opposite sides of the first end of the link member respectively to the first and second base brackets in the tiltable manner; and the monitor hinge comprises first and second monitor hinge parts connecting opposite sides of the second end of the link member with first and second monitor brackets in the tiltable manner.

38. The monitor according to claim 37, wherein the link member comprises a monitor angle limiting unit provided in at least one of the first and second monitor hinge parts to limit a tilting angle of the monitor body relative to the link member.

39. The monitor according to claim 37, wherein the link member comprises a tilting angle limiting unit provided in one of the first and second base hinge parts to limit a tilting angle of the link member relative to the base member.

* * * * *

UNITED STATES PATENT AND TRADEMARK OFFICE
CERTIFICATE OF CORRECTION

| | | |
|---|---|---|
| PATENT NO. | : 7,177,144 B2 | Page 1 of 2 |
| APPLICATION NO. | : 10/314350 | |
| DATED | : February 13, 2007 | |
| INVENTOR(S) | : Sang-Kyeong Ha et al. | |

It is certified that error appears in the above-identified patent and that said Letters Patent is hereby corrected as shown below:

Column 12, Line 15, after "supporting" insert --the--.

Column 12, Line 51, after "fitted" insert --to the boss receiving part of the first or second base bracket provided at one end thereof, and a--.

Column 12, Line 53-55, after "thereof; and" delete "to the boss receiving part of the first or second bracket provided at one end thereof, and a".

Column 14, Line 22, after "assembly" insert --having a link member--.

Column 14, Line 28, after "disposed" insert --adjacent to the link member--.

Column 14, Line 30, after "link" change "assembly" to --member--.

Column 15, Line 22, after "assembly" insert --,--.

Column 17, Line 42, change "titlable" to tiltable.

Column 18, Line 1, change "lik" to --link--.

Column 18, Claim 34, Line 1, change "titled" to --tilted--.

Column 18, Claim 34, Line 3, change "hing" to --hinge--.

Column 18, Claim 34, Line 3, delete "lik" to --link--.

Column 18, Claim 35, Line 17, change "titably" to --tiltably--.

UNITED STATES PATENT AND TRADEMARK OFFICE
CERTIFICATE OF CORRECTION

PATENT NO. : 7,177,144 B2
APPLICATION NO. : 10/314350
DATED : February 13, 2007
INVENTOR(S) : Sang-Kyeong Ha et al.

It is certified that error appears in the above-identified patent and that said Letters Patent is hereby corrected as shown below:

Column 18, Claim 36, Line 26, after "to" delete "the".

Signed and Sealed this

Twelfth Day of June, 2007

JON W. DUDAS
*Director of the United States Patent and Trademark Office*